US010517205B2

(12) United States Patent
Garner et al.

(10) Patent No.: US 10,517,205 B2
(45) Date of Patent: Dec. 31, 2019

(54) SEED METER ASSEMBLY FOR A SEEDING MACHINE

(71) Applicant: Deere & Company, Moline, IL (US)

(72) Inventors: Elijah B. Garner, Bettendorf, IA (US); Kamalakannan Natarajan, Vellore (IN)

(73) Assignee: DEERE & COMPANY, Moline, IL (US)

( * ) Notice: Subject to any disclaimer, the term of this patent is extended or adjusted under 35 U.S.C. 154(b) by 534 days.

(21) Appl. No.: 14/869,742

(22) Filed: Sep. 29, 2015

(65) Prior Publication Data

US 2016/0128271 A1 May 12, 2016

Related U.S. Application Data

(60) Provisional application No. 62/100,431, filed on Jan. 6, 2015, provisional application No. 62/077,030, filed on Nov. 7, 2014.

(51) Int. Cl.
*A01C 7/04* (2006.01)
*A01C 7/16* (2006.01)
(Continued)

(52) U.S. Cl.
CPC .............. *A01C 7/046* (2013.01); *A01C 7/127* (2013.01); *A01C 7/16* (2013.01); *A01C 7/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,203,771 A | * | 6/1940 | Bennett | A01C 7/127 111/69 |
| 2,510,658 A | * | 6/1950 | Rassmann | A01C 7/04 111/81 |

(Continued)

FOREIGN PATENT DOCUMENTS

| | | |
|---|---|---|
| DE | 3405361 | 12/1984 |
| EP | 2213152 | 8/2010 |

(Continued)

OTHER PUBLICATIONS

Kinze, "Kinze Announces the World's First Electric Multi-Hybrid Concept Planter" (2013) 3 pages, http://www.kinze.com/article.aspx?id=167&Kinze+Announces+the+World's+First+Electric+Multi-Hybrid+Concept+Planter, Kinze Manufacturing, Inc.

(Continued)

*Primary Examiner* — Alicia Torres
(74) *Attorney, Agent, or Firm* — Michael Best & Friedrich LLP

(57) ABSTRACT

A seed meter assembly for a seeding machine. The seed meter assembly has a metering member mounted for rotation about a meter axis and driven to rotate in a direction of travel, the metering member having an inner surface configured to receive seeds and an outer surface and apertures passing through the metering member between the inner surface and the outer surface at a radial distance from the meter axis. The seed meter assembly also has a loader including at least one loader surface movable into and out of a position in which the loader surface is disposed at the radial distance adjacent one of the apertures.

20 Claims, 17 Drawing Sheets

(51) Int. Cl.
*A01C 7/20* (2006.01)
*A01C 7/12* (2006.01)

(56) References Cited

U.S. PATENT DOCUMENTS

| | | | |
|---|---|---|---|
| 2,960,258 | A | 11/1960 | Dodwell |
| 4,029,235 | A | 6/1977 | Grataloup |
| 4,285,444 | A | 8/1981 | Tye |
| 4,511,061 | A | 4/1985 | Gaspardo |
| 5,170,909 | A | 12/1992 | Lundie et al. |
| 6,173,664 | B1 | 1/2001 | Heimbuch |
| 6,352,042 | B1 * | 3/2002 | Martin .................. A01C 7/046 111/184 |
| 6,516,733 | B1 | 2/2003 | Sauder et al. |
| 6,527,205 | B2 | 3/2003 | Andersson et al. |
| 6,681,706 | B2 | 1/2004 | Sauder et al. |
| 6,834,600 | B1 | 12/2004 | Clewell et al. |
| 7,140,310 | B2 | 11/2006 | Mayerle et al. |
| 7,343,868 | B2 | 3/2008 | Stephens et al. |
| 7,661,377 | B2 | 2/2010 | Keaton et al. |
| 8,418,634 | B2 | 4/2013 | Shoup |
| 8,543,238 | B2 | 9/2013 | Straeter |
| 8,671,856 | B2 | 3/2014 | Garner et al. |
| 8,850,998 | B2 | 10/2014 | Garner et al. |
| 8,985,037 | B2 | 3/2015 | Radtke et al. |
| 9,516,804 | B1 | 12/2016 | Djeu |
| 9,554,503 | B2 * | 1/2017 | Noer ..................... A01C 7/081 |
| 2010/0192818 | A1 | 8/2010 | Garner et al. |
| 2010/0192819 | A1 | 8/2010 | Garner et al. |
| 2010/0224110 | A1 | 9/2010 | Mariman |
| 2011/0219994 | A1 | 9/2011 | Gilstring |
| 2013/0192504 | A1 | 8/2013 | Sauder et al. |
| 2014/0007801 | A1 | 1/2014 | Sauder |
| 2014/0144357 | A1 | 5/2014 | Garner et al. |
| 2014/0182494 | A1 | 7/2014 | Friestad et al. |
| 2014/0230705 | A1 | 8/2014 | Radtke et al. |
| 2014/0352586 | A1 | 12/2014 | Straeter |
| 2015/0059630 | A1 | 3/2015 | Kinzenbaw et al. |
| 2015/0122163 | A1 | 5/2015 | Zumdome et al. |
| 2015/0223392 | A1 | 8/2015 | Wilhelmi et al. |
| 2015/0230398 | A1 | 8/2015 | Garner et al. |
| 2015/0237794 | A1 | 8/2015 | Saunder et al. |
| 2015/0282422 | A1 | 10/2015 | Hahn et al. |
| 2015/0289441 | A1 | 10/2015 | Arnett et al. |
| 2015/0319919 | A1 | 11/2015 | Saunder et al. |
| 2015/0351315 | A1 | 12/2015 | Wendte et al. |
| 2016/0037713 | A1 | 2/2016 | Wendte et al. |
| 2016/0128267 | A1 | 5/2016 | Garner et al. |
| 2016/0128268 | A1 | 5/2016 | Garner et al. |
| 2016/0128269 | A1 | 5/2016 | Helmick et al. |
| 2016/0128273 | A1 | 5/2016 | Garner et al. |
| 2016/0143212 | A1 | 5/2016 | Wendte et al. |
| 2016/0143213 | A1 | 5/2016 | Kowalchuk |
| 2016/0192580 | A1 | 7/2016 | Wendte et al. |
| 2016/0227700 | A1 | 8/2016 | Wendte et al. |
| 2016/0337713 | A1 | 11/2016 | Harrison |

FOREIGN PATENT DOCUMENTS

| | | |
|---|---|---|
| EP | 2901832 | 8/2015 |
| EP | 3050418 | 8/2016 |
| FR | 2414288 | 8/1979 |
| WO | 2015031840 | 3/2015 |
| WO | 2015077743 | 5/2015 |

OTHER PUBLICATIONS

Baxley, B, "Kinze Announces the World's First Electric Multi-Hybrid Concept Planter," announcement (2013) 2 pages, Kinze Manufacturing, Inc.
EP15193420.5 Extended European Search Report dated Apr. 5, 2016 (10 pages).
EP15193456.9 Extended European Search Report dated Apr. 4, 2016 (10 pages).
EP15193452.8 Extended European Search Report dated Apr. 7, 2016 (6 pages).
EP15193439.5 Extended European Search Report dated Apr. 4, 2016 (7 pages).
EP15193449.4 Extended European Search Report dated Apr. 5, 2016 (10 pages).
Office Action from the US Patent and Trademark Office for U.S. Appl. No. 14/869,723 dated Dec. 30, 2016 (9 pages).
Office Action from the US Patent and Trademark Office for U.S. Appl. No. 14/869,671 dated Jan. 17, 2017 (10 pages).
Office Action from the US Patent and Trademark Office for U.S. Appl. No. 14/869,693 dated Jan. 4, 2017 (12 pages).
Office Action from the US Patent and Trademark Office for U.S. Appl. No. 14/869,708 dated Jan. 4, 2017 (11 pages).

* cited by examiner

SEED METER ASSEMBLY FOR A SEEDING MACHINE

CROSS-REFERENCE TO RELATED APPLICATIONS

This application claims priority to U.S. Provisional Patent Application No. 62/077,030 filed on Nov. 7, 2014, and to U.S. Provisional Patent Application No. 62/100,431 filed on Jan. 6, 2015, the contents of both of which are incorporated by reference herein.

BACKGROUND

The present disclosure relates to a seed meter for a seeding machine. A seed meter transfers seeds from a seed pool to a seed delivery mechanism, which deposits seeds in the ground.

SUMMARY

In one aspect, the disclosure provides a seed meter assembly for a seeding machine. The seed meter assembly includes a metering member mounted for rotation about a meter axis and driven to rotate in a direction of travel, the metering member having an inner surface configured to receive seeds and an outer surface and apertures passing through the metering member between the inner surface and the outer surface at a radial distance from the meter axis. The seed meter assembly also includes a loader including at least one loader surface movable into and out of a position in which the loader surface is disposed at the radial distance adjacent one of the apertures.

In another aspect, the disclosure provides a row unit for a seeding machine. The row unit includes a seed meter assembly having a rotatable metering member for selecting and transporting seeds from a seed pool. The metering member is driven about a meter axis for rotation in a direction of travel and includes apertures disposed at a radial distance from the metering axis. The row unit also includes a seed delivery mechanism for discharging the seeds from the seeding machine, and a loader. The loader is disposed between the metering member and the seed delivery mechanism for directing the seeds from the metering member to the seed delivery mechanism. The loader includes a loader surface configured to move into and out of a position in which the loader surface is disposed at the radial distance adjacent one of the apertures.

In yet another aspect, the disclosure provides a loader for a seed meter assembly. The loader includes a hub defining an axis of rotation, an arm extending from the hub generally in a plane normal to the axis of rotation, a driven member extending from one of the hub or the arm generally parallel to the axis of rotation, the driven member configured to rotate the hub at least partially about the axis, and a paddle extending from the arm in a direction generally opposite the driven member.

Other aspects of the disclosure will become apparent by consideration of the detailed description and accompanying drawings.

DETAILED DESCRIPTION

Before constructions of the disclosure are explained in detail, it is to be understood that the disclosure is not limited in its application to the details of construction and the arrangement of components set forth in the following description or illustrated in the accompanying drawings. The disclosure is capable of other constructions and of being practiced or of being carried out in various ways.

Figure 1:
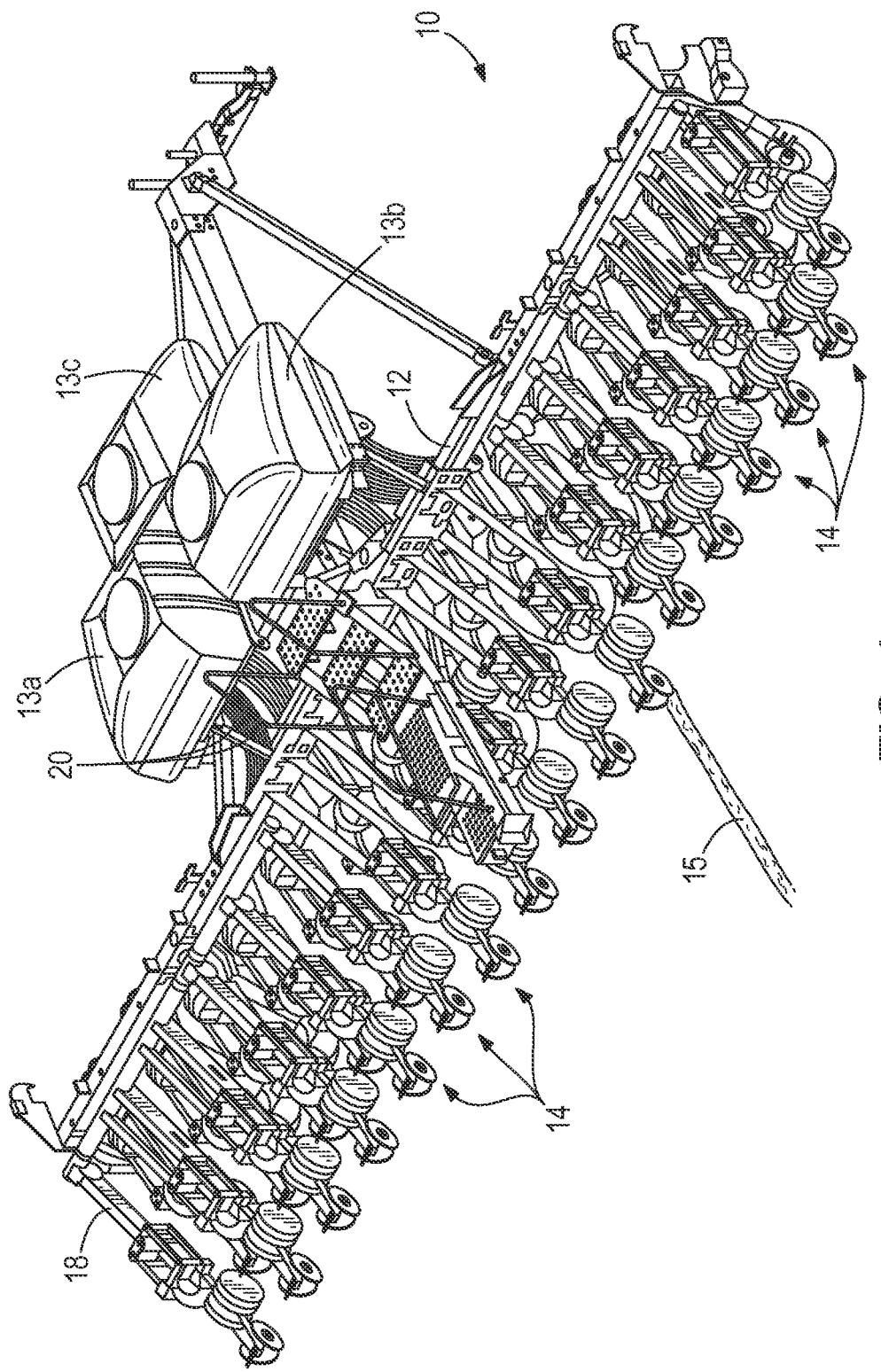
FIG. 1 is a perspective view of a seeding machine.

FIG. 1 illustrates a seeding machine 10, such as a row crop planter. The seeding machine 10 has a frame 12 on which are mounted a plurality of individual row units 14. Seed sources, such as storage tanks 13a-13c, hold seed that is delivered, e.g., pneumatically or in any other suitable manner, to a mini-hopper 22 (see FIG. 2) on each row unit 14. The storage tanks 13a-13c may be coupled to the mini-hoppers 22 by way of conduits 20, such as hoses, and a pressurized delivery apparatus (not shown). Each storage tank 13a-13c can contain the same or different varieties of seed. Thus, each row unit 14 can be coupled to several conduits 20 such that each row unit 14 is coupled to each storage tank 13a-13c to receive seed.

Each row unit 14 has a frame 18 to which the components of the row unit 14 are mounted. For example, the frame 18 may carry furrow opening disks for forming an open furrow 15 in the soil beneath the seeding machine 10 into which seed is deposited, and closing and packing wheels to close the furrow 15 over the deposited seed and to firm the soil in the closed furrow 15.

Figure 2:
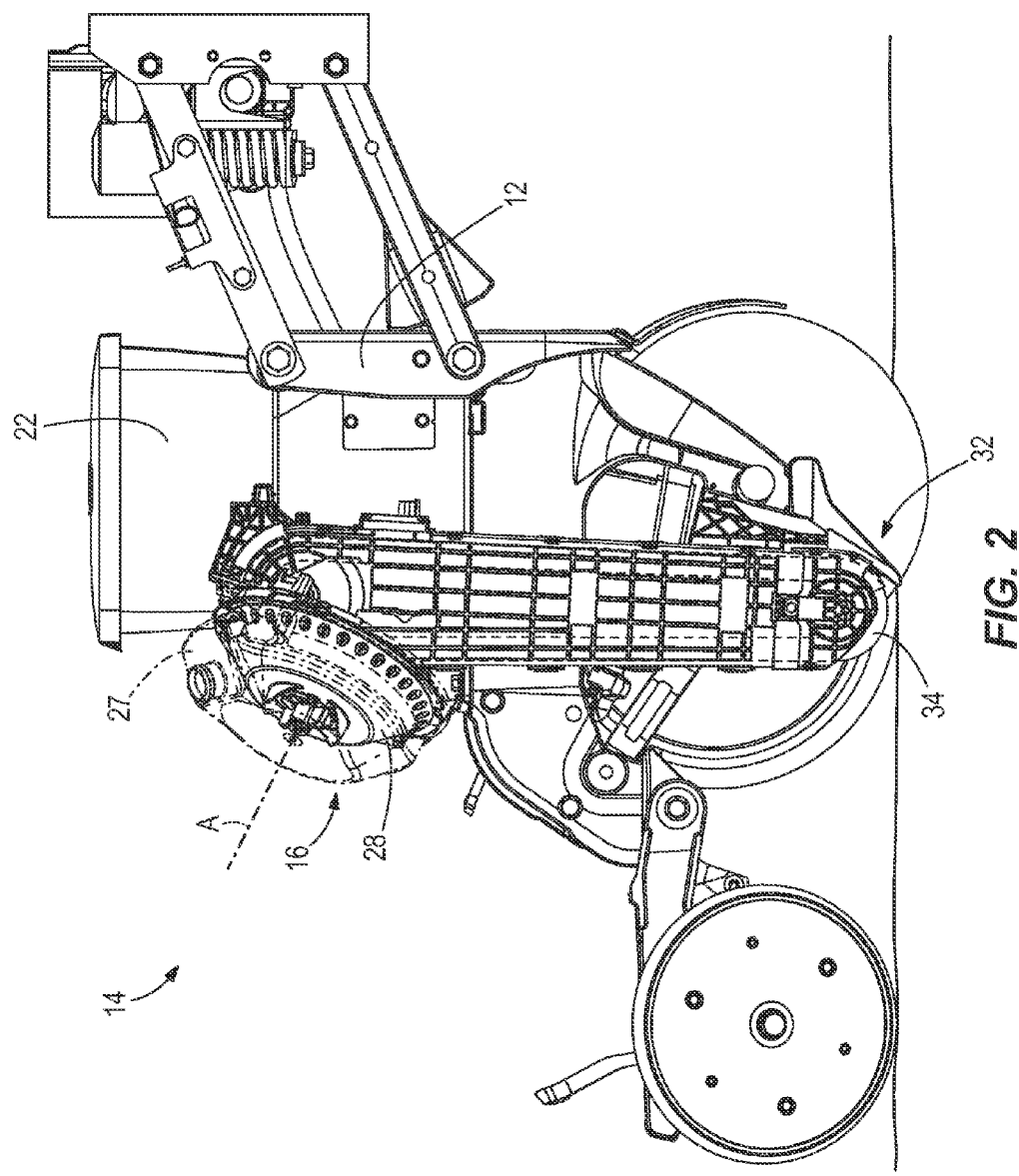
FIG. 2 is a side view of a row unit of the seeding machine of FIG. 1 having a seed meter assembly and seed delivery mechanism.
Figure 3:
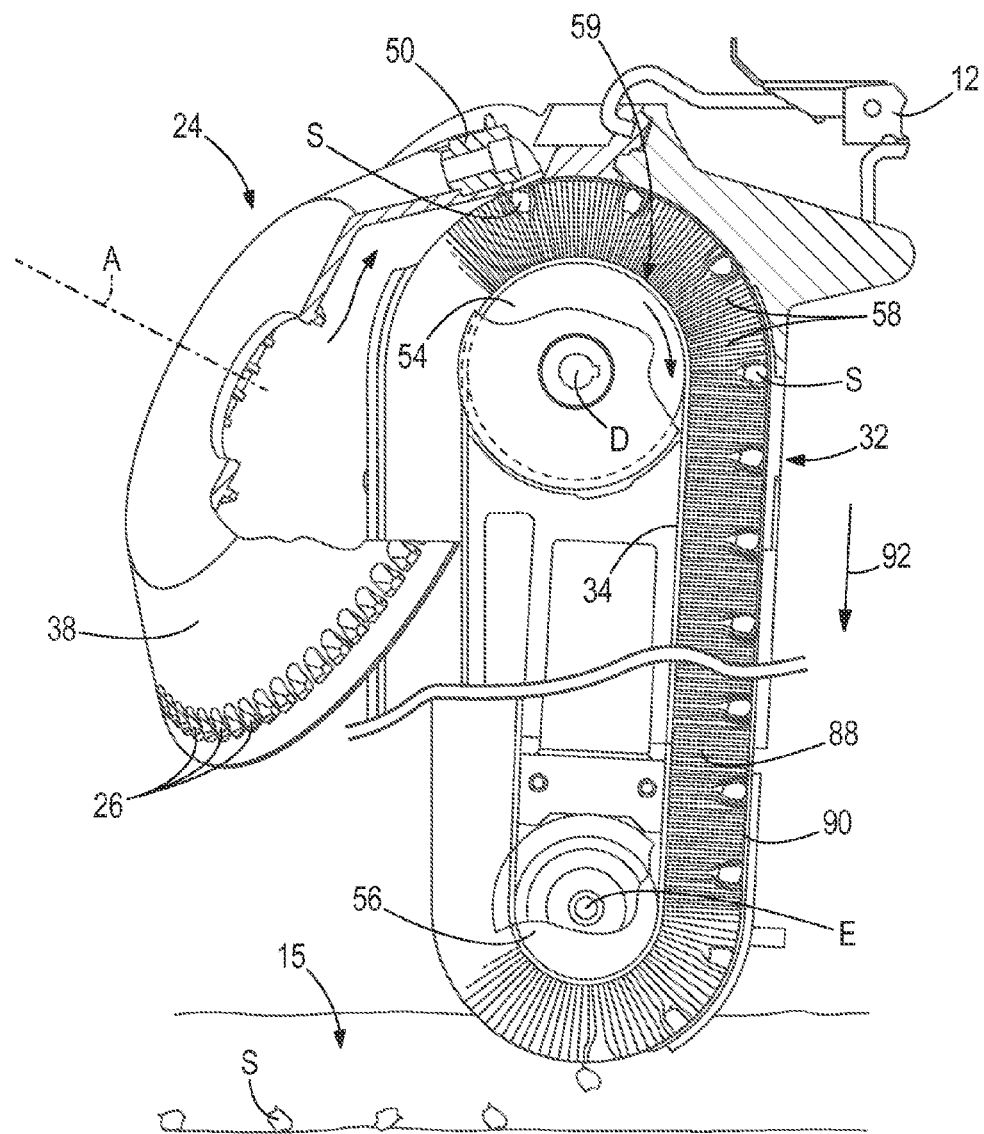
FIG. 3 is a side sectional view of a portion of the seed meter assembly and the seed delivery mechanism of FIG. 2.
Figure 4:
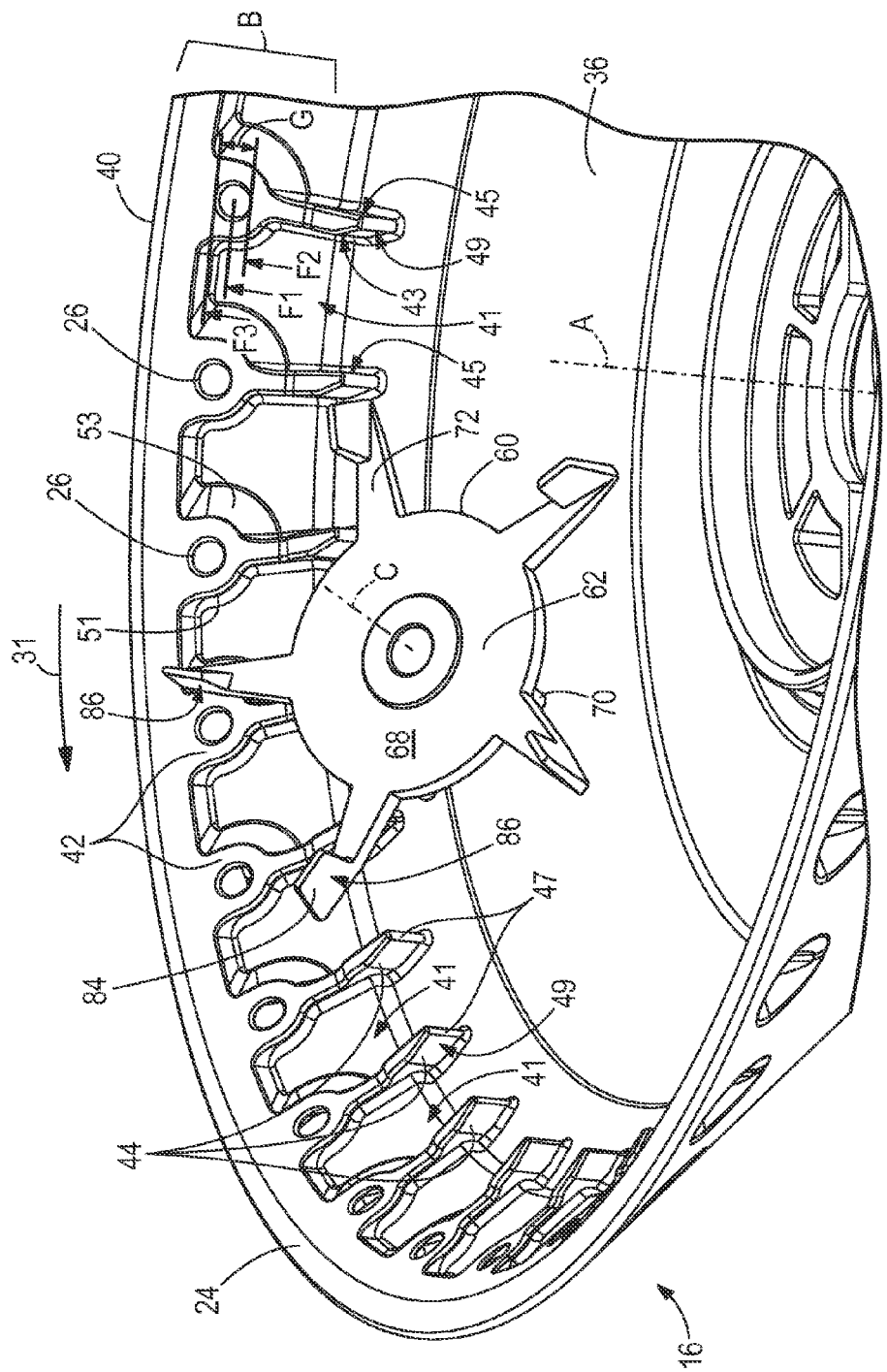
FIG. 4 is a front perspective view of a portion of the seed meter assembly of FIG. 2.

With reference to FIGS. 2-4, a seed meter assembly 16 is coupled to each row unit frame 18. The seed meter assembly 16 takes seeds from a seed pool and sequentially discharges single seeds S. The seed meter assembly 16 includes a rotationally mounted metering member 24, which can be in the form of a disk (or more generally a plate), a bowl, or other rotating element having an inner surface 36 on a seed side and an outer surface 38 on an outer side generally opposite the seed side. Apertures 26 extend through the metering member 24 from the inner surface 36 to the outer surface 38. The apertures 26 are disposed at a central radial distance F1, which is measured generally from the metering axis A to a center of the respective aperture 26. Each aperture 26 has a diameter G. Thus, an inner edge of each aperture 26 is disposed at an inner radial distance $F2=F1-G/2$, and an outer edge of each aperture 26 is disposed at an outer radial distance $F3=F1+G/2$, as illustrated in FIG. 4.

As one example, the seed meter assembly 16 may use one or more pressure devices, such as an air pressure device, to generate a pressure differential between the inner surface and the outer surface, (i.e., vacuum and/or positive pressure), to adhere seeds to the inner surface 36 (i.e., the seed side) of the metering member 24 at each aperture 26. Thus, the seeds are adhered to the metering member 24 generally at the central radial distance F1. The pressure device (not shown) may include a pump, a fan, a compressor, a tank of compressed air or fluid, or any other suitable device for moving fluid to generate the pressure differential. The pressure device may generate the pressure differential using air or any other suitable fluid.

The apertures 26 are generally arranged circumferentially about a meter axis A in an annular zone B proximate an outer edge 40 of the metering member 24. The annular zone B can be substantially void of paddles or similar projections extending away from the inner surface 36 beyond the thickness of the aperture 26. In the illustrated construction, each aperture 26 extends through a raised portion or land 42 that is generally higher than (or in other constructions may be a level portion flush with) the surrounding inner surface 36 in the annular zone B, which may include incidental surface variations, such as manufacturing surface variations, that extend slightly higher than the lands 42. In some constructions, each aperture 26 extends through a thicker or the thickest portion of the metering member 24 in the annular zone B, although the topography of the outer surface 38 may vary such that the land 42 may not be the thickest portion of the metering member 24 in the annular zone B despite its appearance from the seed side. Each land 42 includes a leading edge 51 and a trailing edge 53. The leading edge 51 of each land 42 leads the land 42 into the direction of travel 31 during rotation of the metering member 24, and the trailing edge 53 trails the land 42 during rotation of the metering member 24 in the direction of travel 31. As illustrated in FIG. 4, the leading edge 51 rises from the inner surface 36 generally normal to the inner surface 36, and the trailing edge 53 is chamfered or sloped from the land 42 to the inner surface 36.

Adjacent the annular zone B, a driving member 44, such as a tooth, is provided proximate each aperture 26, and is spaced radially from each aperture 26 with respect to the meter axis A, e.g., radially inwards (but may be radially outwards in other constructions). Each driving member 44 extends from the inner surface 36 of the metering member 24 in a direction generally ranging from normal to the inner surface 36 to parallel to the meter axis A. The driving members 44 extend farther from the inner surface 36 than do the lands 42 such that the driving members 44 are raised with respect to the lands 42. In the illustrated construction, each driving member 44 is formed as a radial extension of the land 42. Each driving member 44 extends from the land 42 generally radially inwards towards the metering axis A and has a tip or distal end 47 at a most-radially-inward point. However, the driving members 44 may be formed more discretely from, or completely distinctly from, the lands 42 in other constructions. Each driving member 44 presents a leading wall 43 and an opposing trailing wall 45. The leading wall 43 of each driving member 44 leads the driving member 44 into the direction of travel 31 during rotation of the metering member 24, and the trailing wall 45 trails the driving member 44 during rotation of the metering member 24 in the direction of travel 31. The trailing wall 45 is aligned generally radially with respect to the metering axis A and is disposed substantially normal to the direction of travel 31 of the metering member 24. The leading wall 43 is also aligned generally radially with respect to the metering axis A and substantially normal to the direction of travel 31 but includes a curved or angled face 49 skewed toward the metering axis A (e.g., by about 5 to about 45 degrees with respect to the trailing wall 45, and more specifically, by about 10 to about 30 degrees with respect to the trailing wall 45).

Each pair of adjacent driving members 44 defines a recess 41 therebetween. Each recess 41 may extend between the associated adjacent lands 42, as illustrated in FIG. 4. In the illustrated construction, each recess 41 is bounded by the outer edge 40 in a radially outward direction and generally unbounded in a radially inward direction. Each recess 41 meets an adjacent recess 41 proximate the tip 47 of the driving member 44 therebetween. However, in other constructions, each recess 41 may be discrete or formed distinctly from each adjacent recess 41 such that each recess 41 is bounded by a wall in the radially inward direction. Furthermore, there may be one, two, or more recesses 41 between each adjacent pair of lands 42 and/or between each adjacent pair of driving members 44.

Referring again to FIG. 2, a seed meter housing 27 generally encloses the metering member 24 and can at least partially define a seed reservoir 28 containing a seed pool. The seed meter housing 27 is fixed to the frame 12 such that the metering member 24 rotates within the housing 27. The metering member 24 may be driven to rotate about meter axis A by a motor, such as an electric motor (not shown). In other constructions, other types of motors, (e.g., hydraulic, pneumatic, and the like) may be used as well as various types of mechanical drives. The seed reservoir 28 in the illustrated device is positioned on the inner side of the metering member 24 proximate the inner surface 36 at a lower portion thereof, and is connected to one or more of the storage tanks 13a-13c to receive seeds therefrom by way of the conduits 20. A star wheel 50 is resiliently and rotatably mounted adjacent the outer surface 38 of the metering member 24 at a fixed location, and has arms 52 or other projections configured to sequentially pass partially or completely through one of the apertures 26 from behind to urge a seed away from the inner surface 36 and to also disrupt the applied pressure differential, as will be further detailed below. The arms 52 are spaced such that each adjacent arm 52 sequentially enters the next aperture 26 as the metering member 24 rotates. In other constructions, other types of aperture release mechanisms may be employed.

A seed delivery mechanism 32 is also coupled to each row unit frame 18. The seed delivery mechanism 32 receives metered seeds from the seed meter assembly 16 and delivers the seeds to the furrow 15 in the soil. The seed delivery mechanism 32 may include a belt 34 disposed adjacent the inner surface 36 of the metering member 24 for receiving the metered seeds from the seed meter assembly 16, conveying the metered seeds toward the ground, and expelling the metered seeds in the furrow 15. The belt 34 is driven about one or more pulleys 54, 56 each rotating about a respective axis D, E. Either or both pulleys 54, 56 can be driven by a motor (e.g., an electric motor), or by any hydraulic, pneumatic, or other drive. The belt 34 can be in the form of a brush belt 34 with bristles 58 for trapping, holding, and releasing the metered seeds, whereby seed movement between the seed meter assembly 16 and the furrow 15 is controlled. In other constructions, the seed delivery mechanism 32 may include other types of belts, such as a foam belt, a conveyor belt, a flighted belt, a pocketed belt, a belt with resilient fingers, and the like. In yet other constructions, the seed delivery mechanism 32 can include other types of mechanisms suitable for receiving seeds from the seed meter assembly 16 and conveying the seeds to the furrow 15. For example, the seed delivery mechanism 32 may include one or more tubes to direct seeds from the seed meter assembly 16 to the furrow 15.

Figure 5:
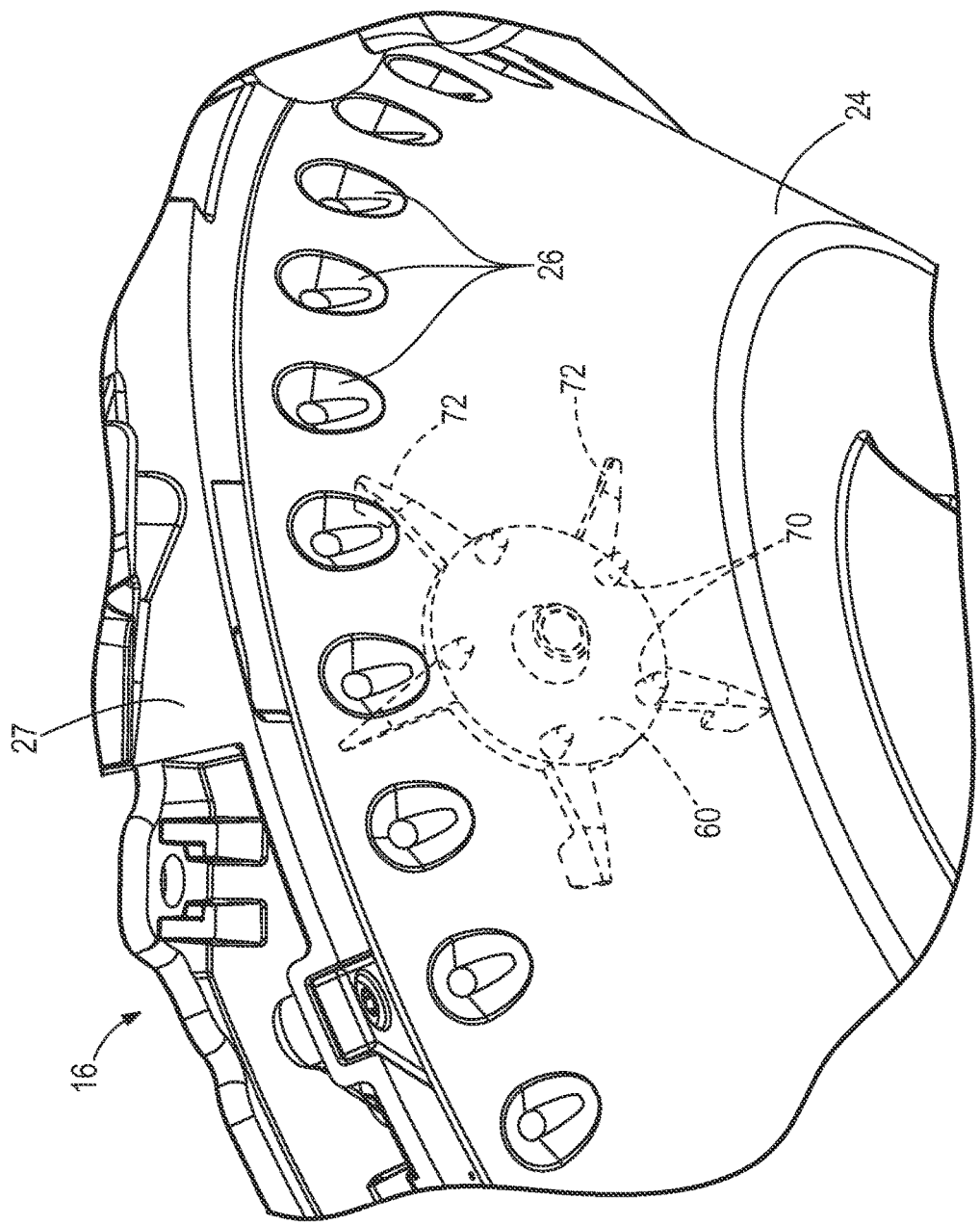
FIGS. 5-6 are rear perspective views of a portion of the seed meter assembly of FIG. 2.
Figure 23:
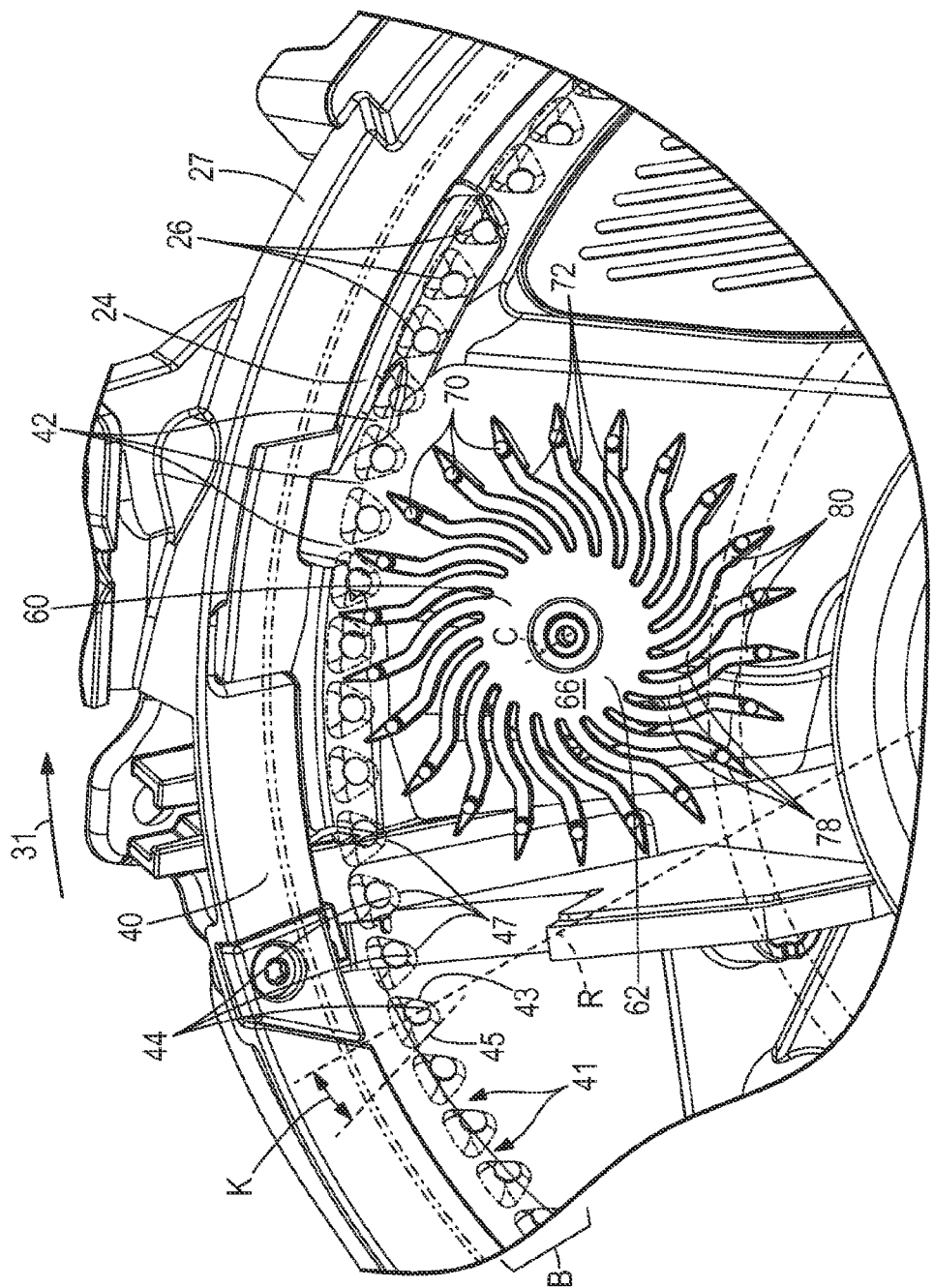
FIG. 23 is an enlarged rear perspective view of a portion of another seed meter assembly, which may be employed with the seeding machine of FIG. 1, having another construction of a loader.

Several constructions of a loader 60 for moving seeds from the metering member 24 to the seed delivery mechanism 32 are shown in FIGS. 4-23. For example, a first construction is shown in FIGS. 4-17, a second construction is shown in FIGS. 18-22, and a third construction is shown in FIG. 23. Like parts are labeled with the same reference numerals and description of one construction applies to all other constructions except where differences are described. As shown in FIGS. 4-5, the loader 60 is disposed adjacent the inner surface 36 of the metering member 24. The loader 60 is a movable member, such as a wheel, a belt (e.g., with pulley(s)), a chain (e.g., with pulley(s)), a reciprocating member, an oscillating member, or any other arrangement movable with respect to the metering member 24. As one example, the loader 60 may include a wheel mounted for rotation about a fixed loader axis C adjacent the inner surface 36 of the rotating metering member 24. The loader axis C may be disposed obliquely with respect to the meter axis A. In other constructions, the loader axis C may be disposed substantially parallel with the meter axis A. The illustrated loader 60 includes a hub portion 62 mounted for rotation (e.g., journalled) for free rotation. For example, the loader 60 may be rotatably mounted to the seed meter housing 27 by way of a bushing 64 as illustrated in FIGS. 6-13; however, in other constructions the loader 60 may be rotatably mounted by a bearing or other rotatable mounting. The illustrated loader 60 can be constructed from metal, plastic, or other suitable material, and is driven about the loader axis C mechanically by engagement with the metering member 24, as will be described in greater detail below. In other constructions, the loader 60 may be driven by a motor or otherwise mechanically driven.

The loader 60 has a first side 66 generally facing the inner surface 36 of the metering member 24 and a second side 68 substantially opposite the first side 66. Driven members 70, such as drive pegs, extend from the hub portion 62 on the first side 66 in a direction generally parallel with the loader axis C. The driven members 70 are disposed circumferentially about the hub portion 62 with respect to the loader axis C at a first radial distance R1 from the loader axis C (FIG. 10). The driven members 70 are radially positioned at R1 and circumferentially spaced on the hub 62 to be drivingly engaged by the leading walls 43 of the driving members 44 on the metering member 24 (i.e., the driving members 44 are configured to push the loader 60 to rotate about the loader axis C as the metering member 24 rotates), as illustrated in sequence in FIGS. 7-9 and further described below. The angled face 49 of the leading wall 43 facilitates a smooth release of driven member 70 at the end of the driving engagement. The loader 60 can have driven members 70 that are shaped and positioned in any other manner suitable for engaging and being driven by the driving members 44 on the rotating metering member 24. As an example, although the illustrated driven members 70 are parallel to the loader axis C and are located on the first side 66, other driven members 70 may have other shapes, configurations, locations, and may extend in different directions and/or extend from different sides or surfaces of the loader 60. For example, the driven members 70 may include gear teeth, radially extending projections, pins, etc.

The illustrated loader 60 also includes paddle arms 72 extending generally away from the hub portion 62 substantially in a plane 74 of the hub portion 62 normal to the loader axis C. The paddle arms 72 are cantilevered from the hub portion 62, which allows radial and/or circumferential flexion capability. In one construction, such as illustrated in FIGS. 4-17, the paddle arms 72 may wholly extend generally radially with respect to the loader axis C.

In the construction of FIGS. 18-22, the paddle arms 72 are disposed to extend obliquely from the hub portion 62 within the plane 74. A recess 76 is formed between each adjacent pair of paddle arms 72, which allows room for flexion of each respective paddle arm 72 in radial and circumferential directions.

Figure 18:
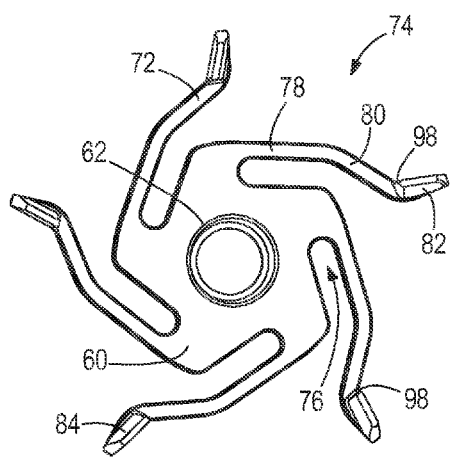
FIG. 18 is a front view of another construction of the loader for the seed meter assembly of FIG. 2.
Figure 20:
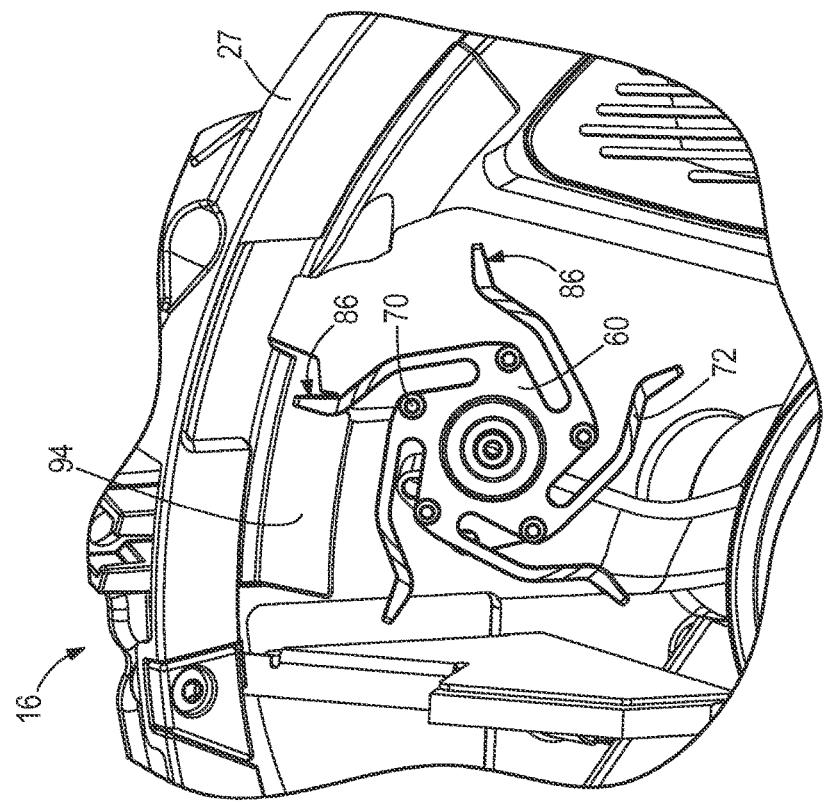
FIG. 20 is another rear view of the loader of FIG. 18 employed with the seed meter assembly of FIG. 2 having the belt removed.

Specifically, as shown in FIG. 18, each paddle arm 72 includes a first portion 78 extending from the hub portion 62, a second portion 80 extending from the first portion 78, and a third portion 82 extending from the second portion 80. In one construction, the first portion 78 extends generally perpendicular to the radial direction with respect to the loader axis C (e.g., +/−no less than about 5 degrees from perpendicular, or, in other constructions, +/−no less than about 30 degrees from perpendicular), the second portion 80 extends transverse to the first portion 78 (e.g., by about 1 to about 45 degrees and, in some constructions, by about 5 to about 30 degrees), and the third portion 82 extends transverse to the second portion 80 (e.g., by about 15 to about 75 degrees, and, in some constructions, by about 35 to about 55 degrees). In some constructions, the third portion 82 may be aligned generally radially with respect to the loader axis C (e.g., no greater than +/−5 degrees from the radial direction).

It is to be understood that the paddle arms 72 may be curved to approximate the first, second, and/or third portions 78, 80, 82 by blending the portions together into a continuous curve. In some constructions, each portion 78, 80, 82 may be curved or partially curved, or some portions may be curved, some may be partially curved and/or some may be generally straight, in any combination. In other constructions, some or all of the paddle arms 72 may include only two portions (e.g., see FIG. 23, described below) or four or more portions.

Each paddle arm 72 includes a paddle 84 extending from the second side 68 in a direction generally parallel with the loader axis C. The paddles 84 are disposed circumferentially about the hub portion 62 with respect to the loader axis C at a second radial distance R2 from the loader axis C greater than the first radial distance R1 (FIG. 10). In the construction of FIGS. 4-17, each paddle 84 extends from a distal end of the paddle arm 72. In the construction of FIGS. 18-22, each paddle 84 extends from the third portion 82 of the paddle arm 72, but may extend from other portions of the paddle arm 72 or from any location on any construction of the paddle arm 72. Each paddle 84 includes a substantially planar loader surface 86 that can be disposed generally parallel with the loader axis C. The loader surface 86 may be oriented generally radially with respect to the loader axis C (e.g., no more than about +/−5 degrees from the radial direction) or may be offset (e.g., by about 5 to about 15 degrees, by about 15 to about 45 degrees in other constructions, or by about 45 to about 89 degrees in still other constructions) from the radial orientation with respect to the loader axis C. Generally, the loader surface 86 faces into the direction of travel 61. Thus, when the paddle 84 is disposed behind an aperture 26, the loader surface 86 faces in the direction of travel 31 of the metering member 24.

The paddle 84 and the loader surface 86 can be shaped and positioned in any other manner suitable for guiding the seeds from the metering member 24. For example, the paddle 84 can extend from other sides or surfaces of the loader 80, can extend in other directions from the loader 60 (such as radially). Furthermore, the loader surface 86 need not be disposed on a paddle 84, and can be disposed on a tooth, such as a gear tooth, a belt, a chain, etc. Although in the illustrated construction the paddles 84 (and therefore the loader surfaces 86) extend from the loader 60 on an opposite side from the driven members 70, the paddles 84 (and therefore the loader surfaces 86) may extend from the loader 60 on the same side or on adjacent sides.

The illustrated driven members 70 and the paddles 84 are spaced and configured with respect to the loader axis C such that each adjacent driving member 44 of the metering member 24 will sequentially engage each adjacent driven member 70 of the loader 60 to drive the loader 60 such that each paddle 84 (or loader surface 86) will approach a seed adhered to an adjacent aperture 26 just as that aperture 26 approaches the belt 34. Each seed is guided by a single loader surface 86, i.e., one loader surface 86 approaches each seed in sequence, such that one loader surface 86 approaches one seed and guides the one seed to the seed delivery mechanism 32 and then the next loader surface 86 approaches the next seed and guides that next seed to the seed delivery mechanism 32. It should be understood that the number, spacing, orientation, and structure of the paddles 84 and loader surfaces 86, the driven members 70, the paddle arms 72, and of the loader 60 as a whole may vary between constructions depending on the configuration of the seed meter assembly 16, e.g., the spacing between apertures 26, the distance from the meter axis A to the apertures 26, the size of the apertures 26, etc. in order to be timed to backstop, guide, or transfer each seed in sequence. In one construction, five paddles 84 and five driven members 70 are employed, and the paddles 84 and driven members 70 are spaced about 72 degrees apart about the loader axis C. However, any number of paddles 84 or loader surfaces 86 may be spaced unevenly about the loader axis C in other constructions. Furthermore, one, two, three, four, six, or more paddles 84 or loader surfaces 86 and/or driven members 70 may be employed in other constructions (e.g., see FIG. 23, described below), and may be spaced evenly or unevenly about the loader axis C to achieve the desired timing with respect to the metering member 24. The disclosure provides generally for a loader 60 having one or more loader surfaces 86 configured to approach each seed individually and in sequence.

Figure 6:
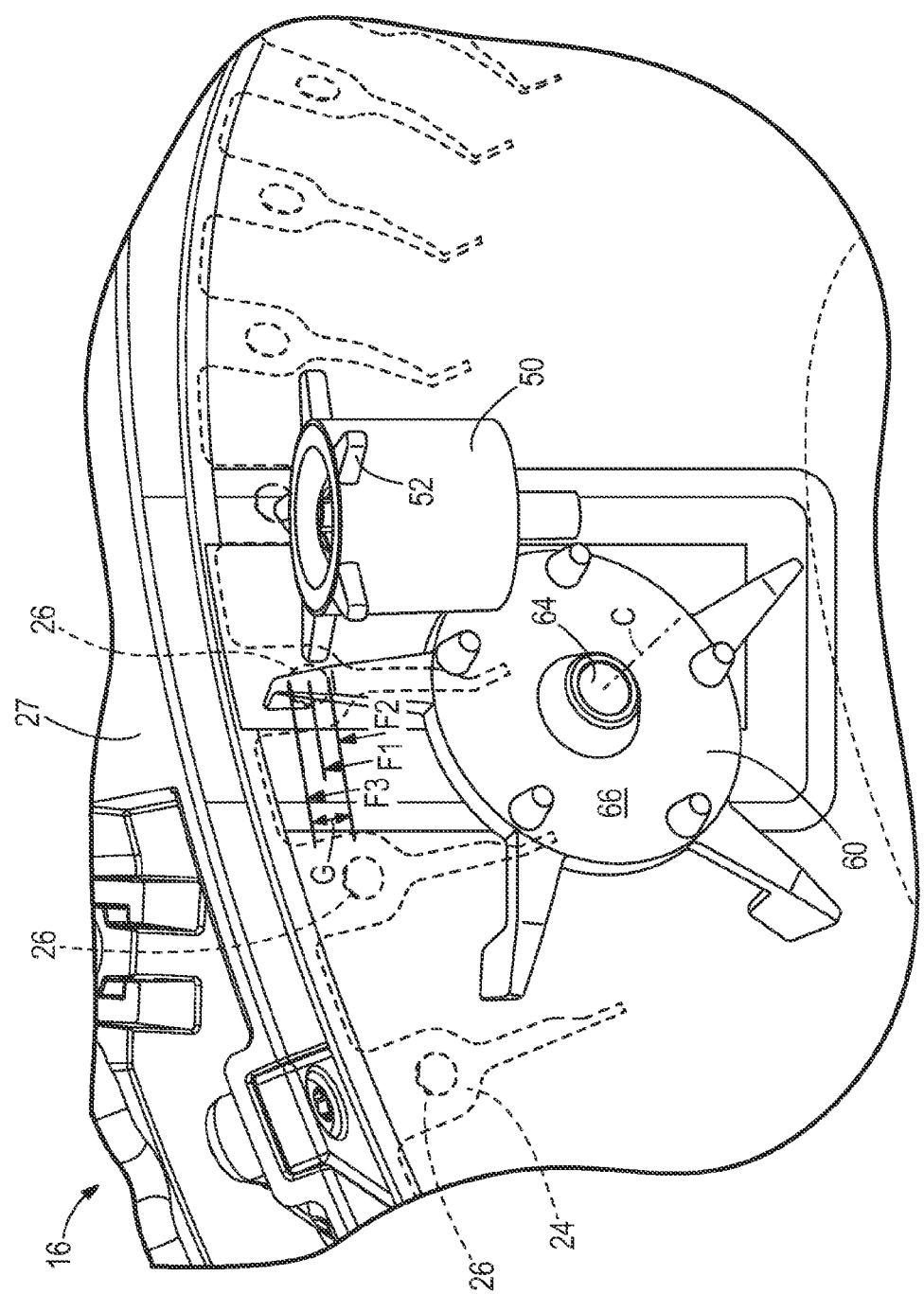
Figure 7:
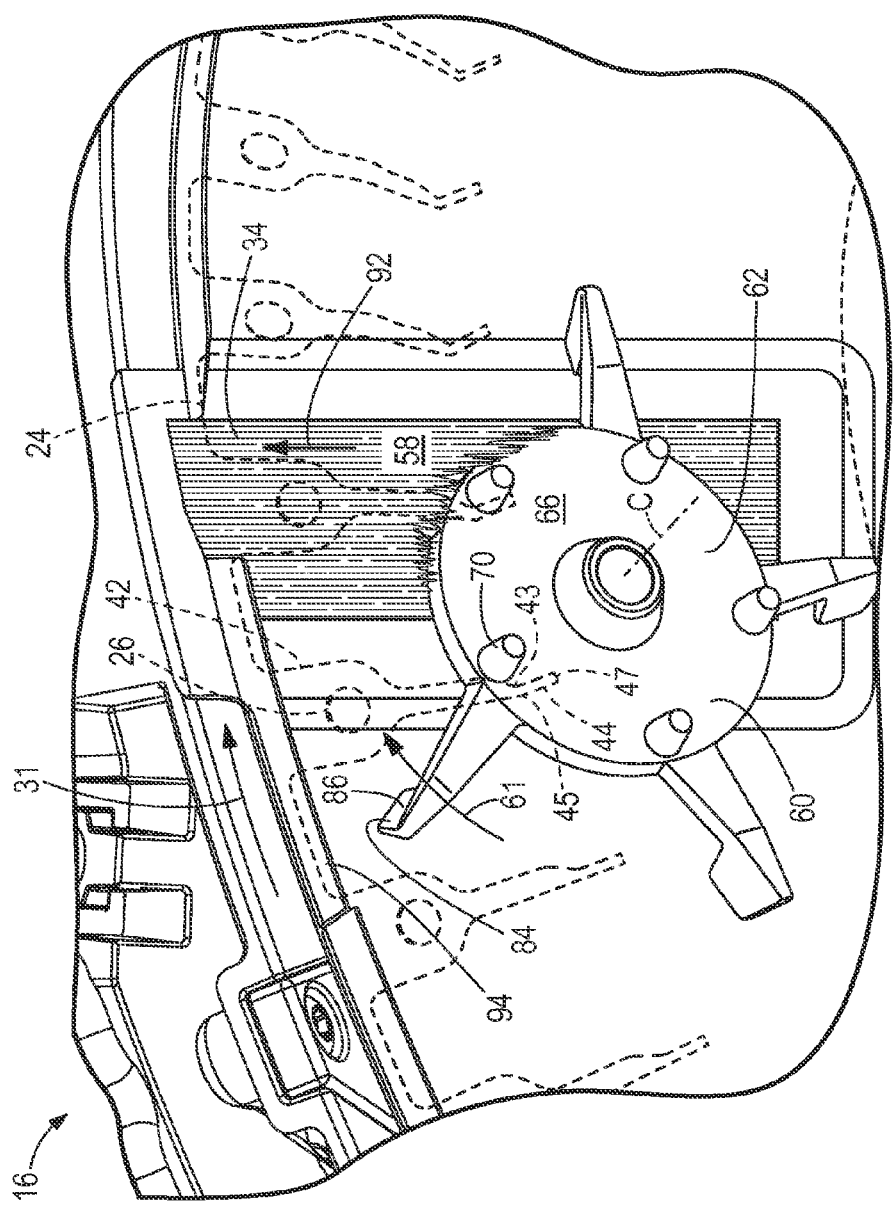
FIGS. 7-9 are rear perspective views of the portion of the seed meter assembly of FIGS. 5-6 illustrating movement of the seed meter assembly in sequence.
Figure 8:
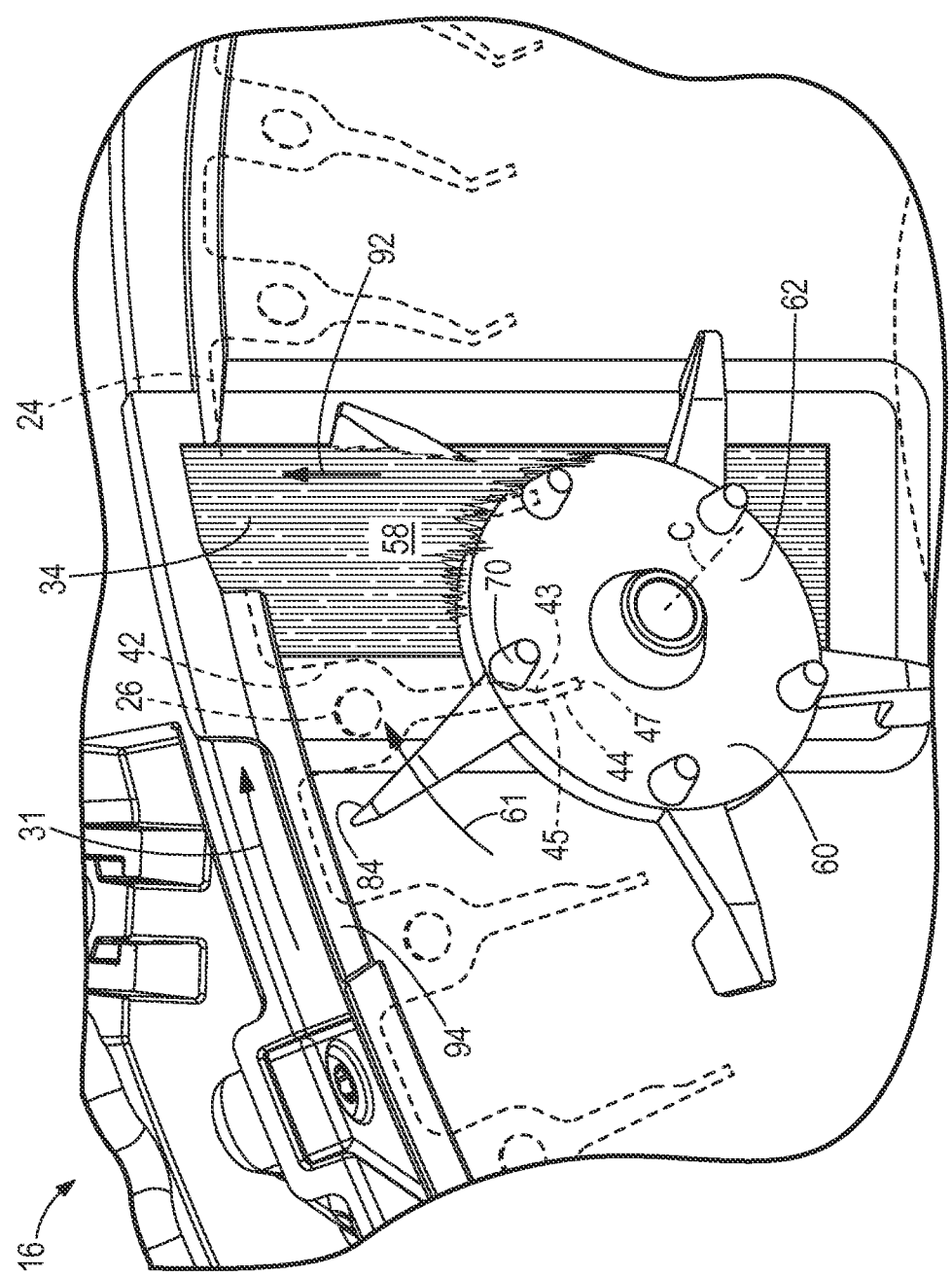
Figure 9:
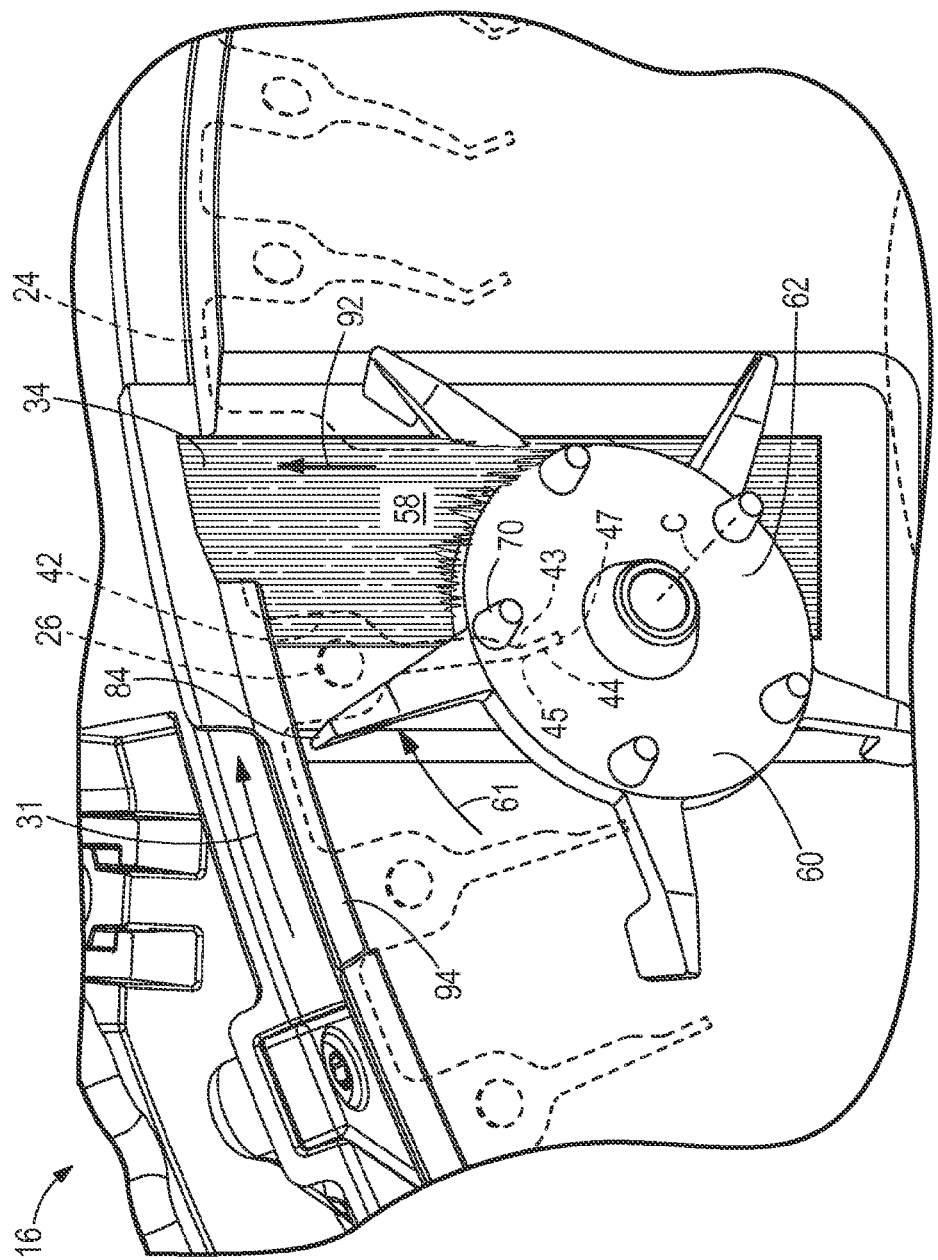
Figure 10:
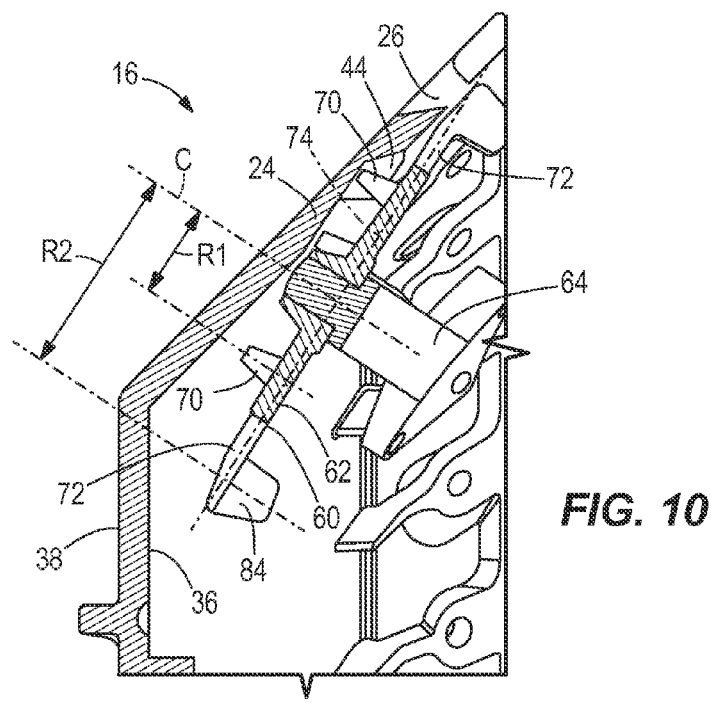
FIGS. 10-11 are side cross section views of the metering member and a loader.
Figure 11:
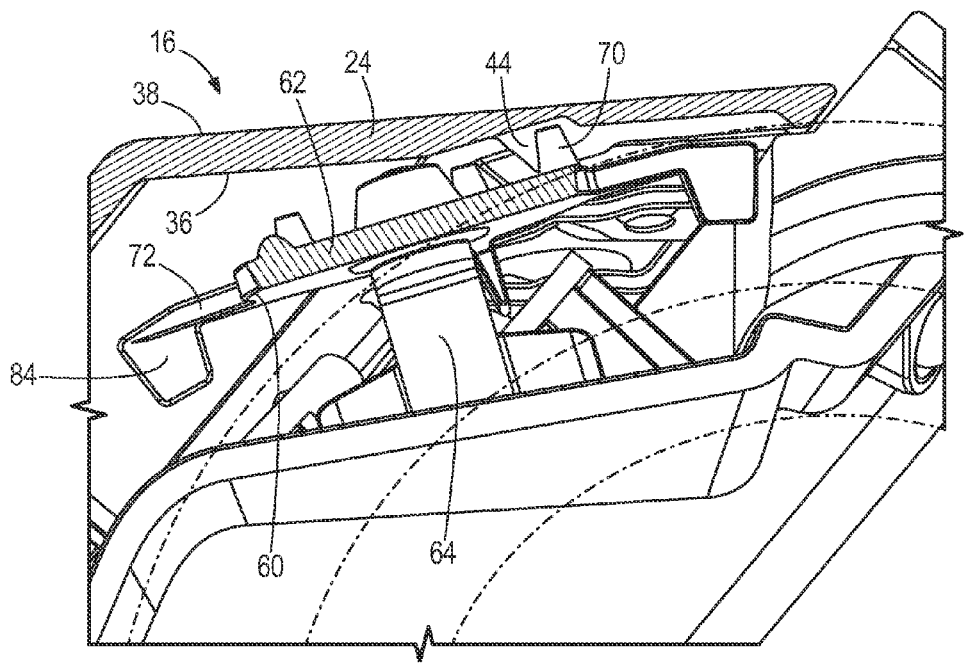
Figure 12:
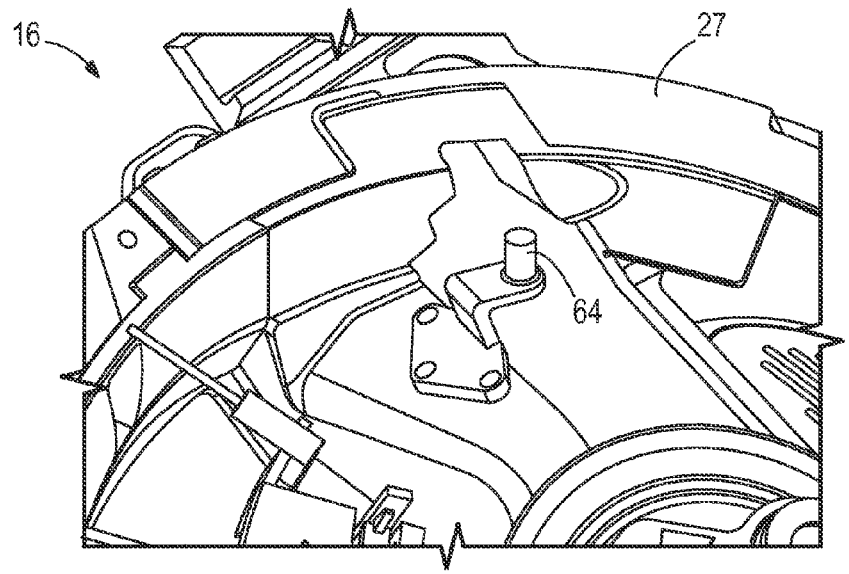
FIGS. 12-13 are rear perspective views of the seed meter assembly of FIG. 2 having portions removed.
Figure 13:
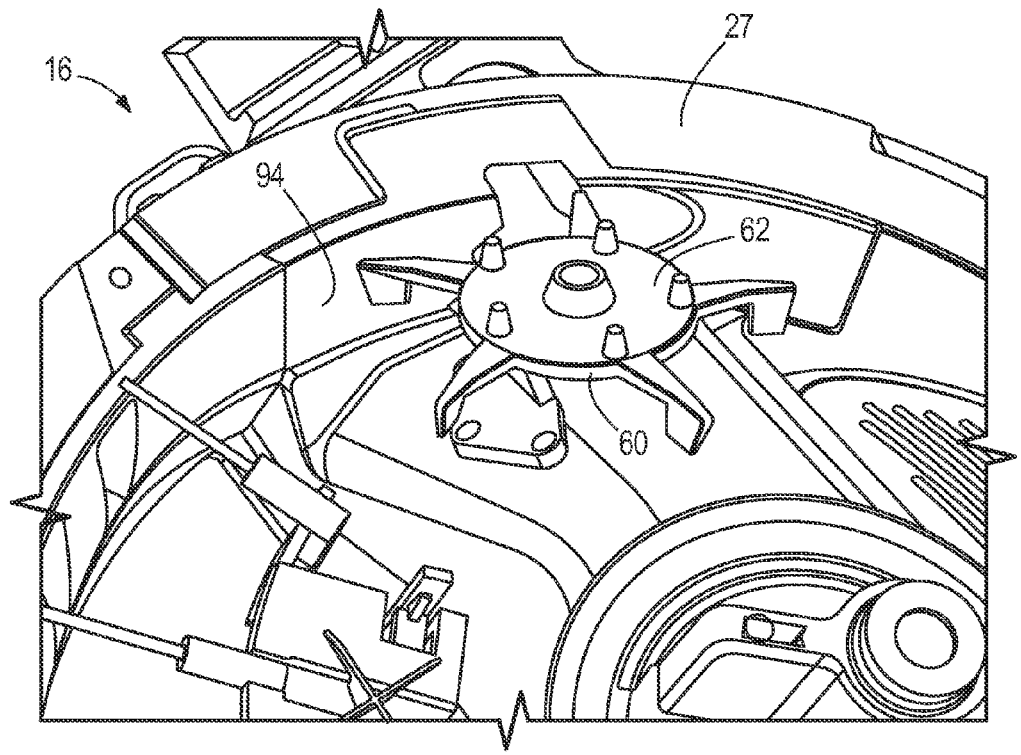
Figure 14:
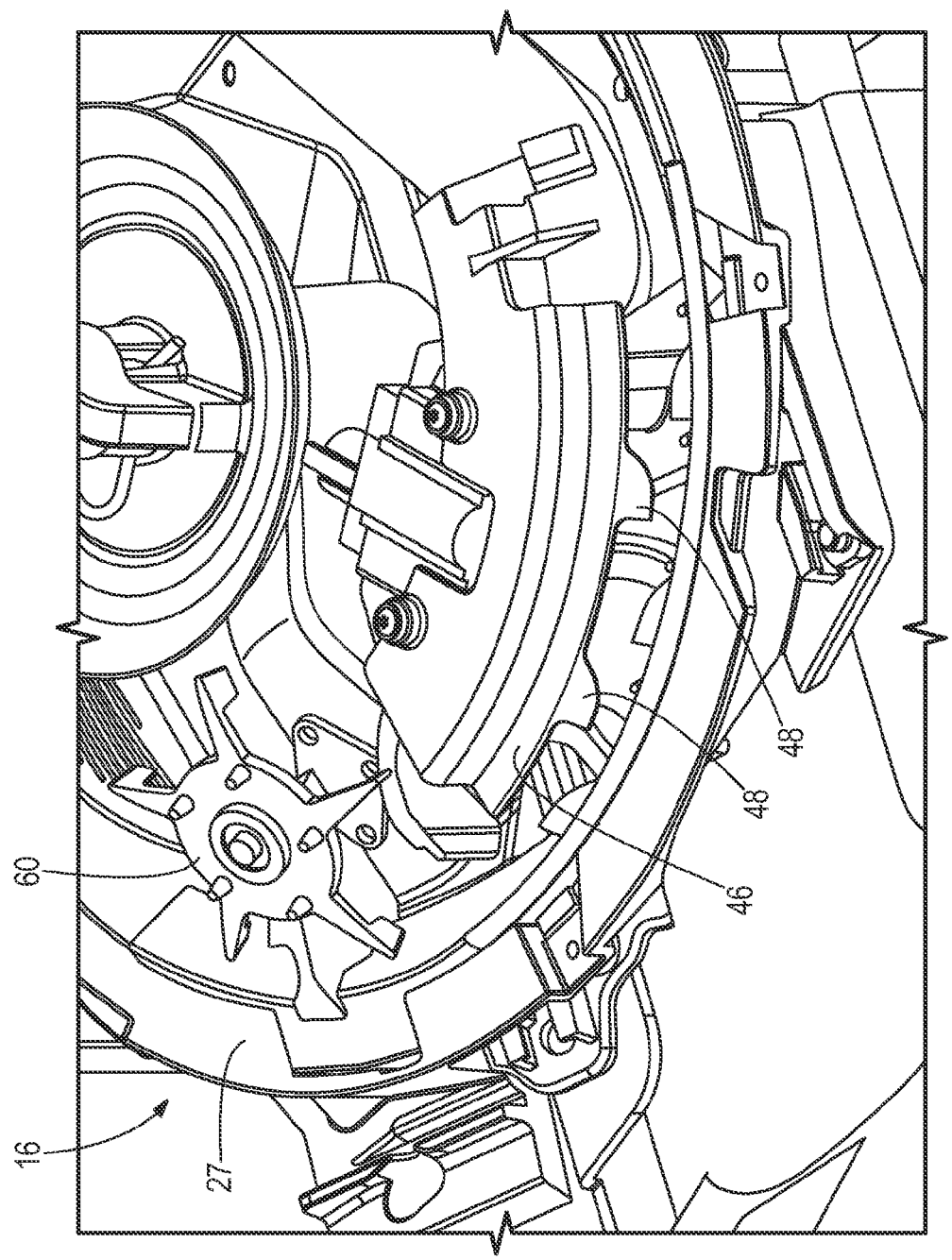
FIG. 14 is another rear perspective view of the seed meter assembly of FIG. 2 having portions removed.
Figure 15:
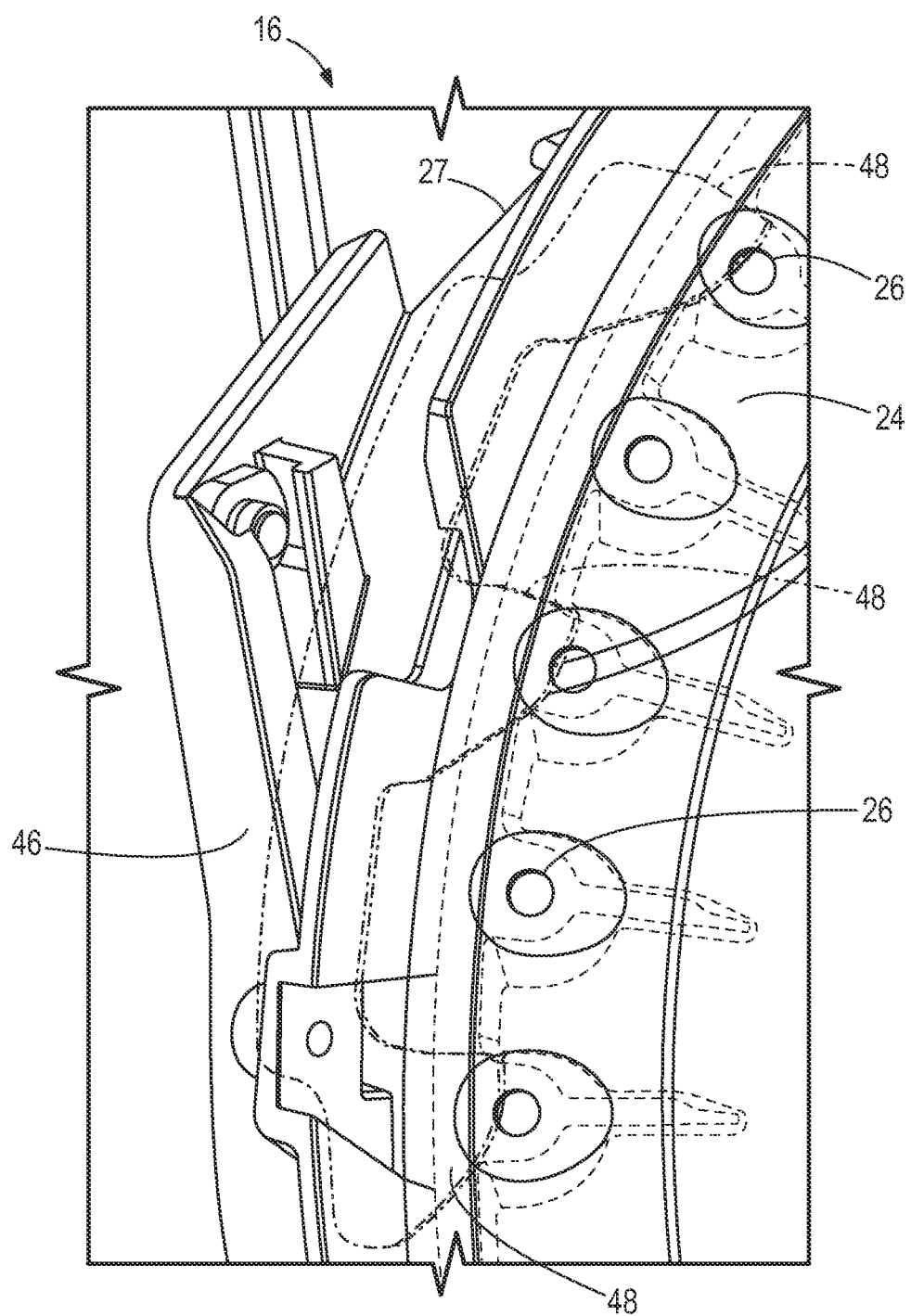
FIG. 15 is an enlarged rear perspective view of a portion of the seed meter assembly of FIG. 2.
Figure 16:
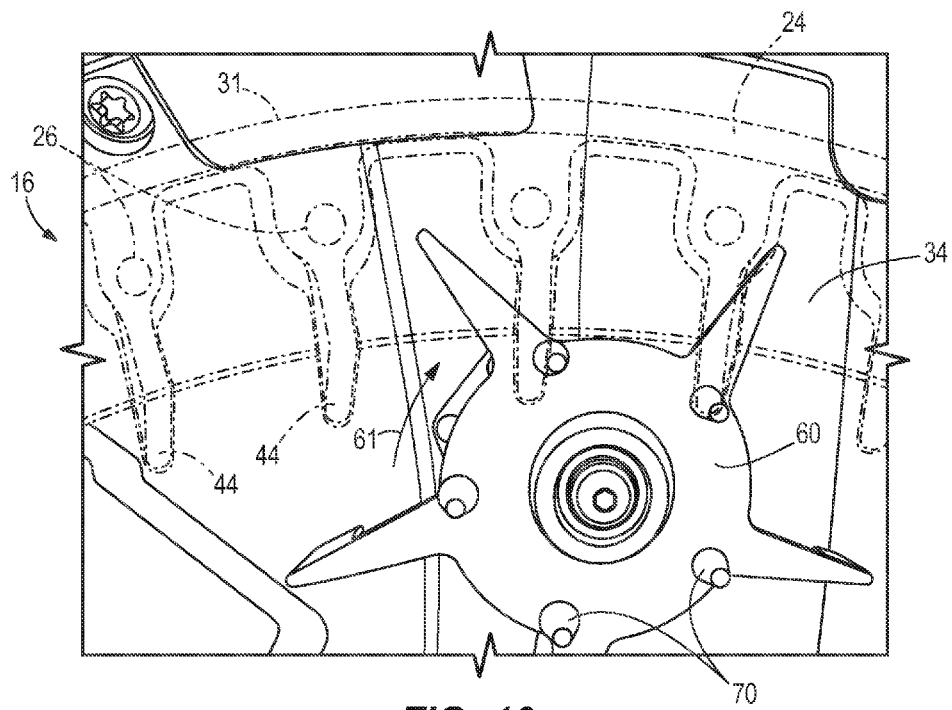
FIG. 16 is another enlarged rear perspective view of a portion of the seed meter assembly of FIG. 2.
Figure 17:
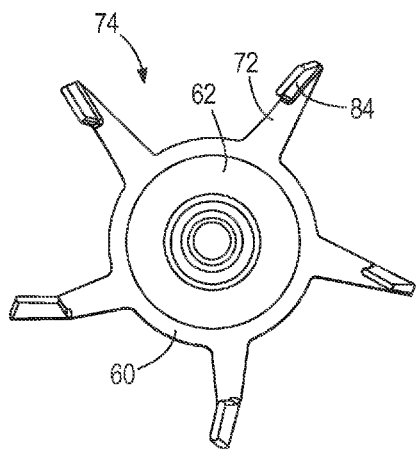
FIG. 17 is a front view of one construction of a loader for the seed meter assembly of FIG. 2.

As can be seen in the progression of FIGS. 7-9, the illustrated loader 60 is driven to rotate in a direction of travel 61 generally the same as the direction of travel 31 of the metering member 24 (e.g., clockwise in the view of FIGS. 7-9) at least in part due to the loader axis C being disposed radially in between the driving members 44 and the meter axis A. As a result, each loader surface 86 is positioned to approach the adjacent aperture 26 in order to backstop the seed (e.g., in a backstop position) to direct the seed by inhibiting the seed from straying during transfer from the metering member 24 to the seed delivery mechanism 32. The loader surface 86 may arrive adjacent the seed approximately or immediately as the seed enters the seed delivery mechanism 32. In the backstop position, the loader surface 86 is disposed at the central radial distance F1 adjacent the aperture 26 being swept. As is apparent from the sequence shown in FIGS. 7-9, and as can be seen in FIG. 6, the loader surface 86 may extend across the entire diameter G of the aperture 26 as the aperture 26 is swept, i.e., is disposed from the inner radial distance F2 to the outer radial distance F3 adjacent the aperture 26 as the aperture 26 is swept.

Accordingly, the speed of the loader surfaces 86 during operation is at least as fast as the speed of the apertures 26 and may be faster than the speed of the apertures 26. As such, each loader surface 86 approaches the adjacent aperture 26 to provide the backstop. In some constructions, each loader surface 86 may furthermore meet or overtake the aperture 26 to additionally engage the seed if desired, e.g., to remove or assist in removal of the seed from adherence with the aperture 26 and/or move the seed into the seed delivery mechanism 32 through engagement with the seed. To achieve a desired speed, the second radial distance R2 may be greater than the first radial distance R1. For example, the second radial distance R2 may be approximately double the first radial distance R1, which has the effect of approximately doubling the speed of the paddles 84 with respect to the apertures 26 (and therefore with respect to the passing seeds S). Other ratios of R2 to R1 may be chosen based on the configuration of the loader 60 and the metering member 24 to achieve the desired effect. Furthermore, the loader 60 may be configured to rotate in a direction generally opposite the metering member 24, in which case the speed of the loader surfaces 86 may be slower, approximately equal to, or faster than the speed of the apertures 26. In other constructions, the loader surface 86 may reciprocate or oscillate into and out of the backstop position from any direction, such as laterally with respect to the metering member 24 in a direction generally normal to or oblique to the metering member 24.

With continued reference to the illustrated constructions, a singulator 46 (FIGS. 14 and 15) is disposed proximate the annular zone B of the metering member 24 in a fixed position adjacent the rotating metering member 24. The singulator 46 is disposed proximate the apertures 26, and includes projections 48, such as blades, teeth, bristles, fingers, or other members, extending toward the apertures 26. The singulator 46 may be formed from rigid and/or flexible material(s).

FIG. 23 illustrates another construction of a metering member 24 and another construction of a loader 60 for use with the seeding machine 10, both having generally the same description and features as the metering member 24 and the loader 60 discussed above. Except as described below, all of the like-numbered features discussed above and shown in FIGS. 4-22 apply to the metering member 24 and loader 60 of FIG. 23. Generally, the metering member 24 of FIG. 23 differs in that the number of apertures 26 is greater and the apertures 26 are spaced closer together, and the loader 60 generally differs in that the number of paddle arms 72 is increased to correspond and be timed with the number and spacing of the apertures 26 in the same manner as described above. For example, the metering member of FIG. 23 may be used for certain types of seed, such as soy, whereas the metering member of FIGS. 4-22 may be used for other types of seed, such as corn.

Each driving member 44 presents a leading wall 43 and an opposing trailing wall 45, as defined above. With continued reference to FIG. 23, the trailing wall 45 and the leading wall 43 face generally normal to the direction of travel 31 but are angled by an angle K of about 5 to about 65 degrees with respect to a radius R of the metering member 24 passing through a center of the adjacent aperture 26, and more specifically, by about 10 to about 30 degrees with respect to the same. Thus, the leading and trailing walls 43, 45 come together at a tip 47 to generally form a triangular wedge or V-shape extending radially inwardly from the aperture 26 toward the meter axis A.

Each pair of adjacent driving members 44 defines a recess 41 therebetween. Each recess 41 may extend between the associated adjacent lands 42, as illustrated in FIG. 4. In the illustrated construction, each recess 41 is bounded by the leading and trailing walls 43, 45 and has a generally triangular shape, or V-shape, which extends into the annular zone B. However, in other constructions, each recess 41 may have other shapes and configurations.

With continued reference to FIG. 23, the loader 60 includes paddle arms 72 having a first portion 78 extending from the hub portion 62 generally obliquely and a second portion 80 extending from the first portion 78. Driven members 70 extend from the first side 66 of the loader 60; more specifically, the driven members 70 extend from the paddle arms 72 and, more specifically, extend from the second portion 80. The paddles 84 (not shown) extend from the second side 68 (not shown) of each paddle arm 72 and include loader surfaces 86 generally as described above, except the number of paddles 84 and paddle arms 72 is greater than that of previously described constructions. The driven members 70 are located just radially inward of distal ends of the paddle arms 72, generally opposite the paddles 84.

In operation, the metering member 24 is driven for rotation about the meter axis A. A pressure differential is applied across the metering member 24, e.g., between the inner surface 36 and the outer surface 38. The metering member 24 rotates about the meter axis A through the seed pool such that seeds from the seed pool are adhered by virtue of the pressure differential to the passing apertures 26. Sometimes, more than one seed per aperture 26 may adhere to the metering member 24. These extra seeds, or "doubles," are substantially reduced or eliminated by the singulator 46. The singulator 46 agitates extra seeds adhered to the metering member 24, thereby dislodging extra seeds and encouraging a single seed S to adhere to a single aperture 26.

Because the annular zone B of the inner surface 36 of the illustrated metering member 24 is a generally flat surface having raised portions 42 that are at most flush with the thickness of the apertures 26, the singulator 46 can be disposed very close (e.g., flush with or adjacent) to the inner surface 36 without interference, and the projections 48 may reach very close to the apertures 26. This improves performance of the singulator in eliminating extra seeds. Furthermore, this allows either rigid or flexible singulators to be effective.

In order to release a seed, the pressure differential may be disrupted or terminated at a desired release position, and/or mechanical assistance can be utilized to knock, pull, or push the seed off the metering member 24, interfere with the aperture 26 to disrupt the pressure differential, or otherwise release the seed. For example, in the illustrated construction, the star wheel 50 and/or other release mechanism will disrupt the pressure differential and contact the seed to detach the seed from the metering member 24. The paddles 84 may additionally or alternatively detach each seed from the metering member 24.

As the metering member 24 rotates, the driving members 44 drive the loader 60 by engaging the driven members 70 in sequence. Referring to FIG. 23, the driven members 70 are driven by engagement with the leading walls 43 and move into and out of the V-shaped recesses 41. The paddles 84 rotate about the loader axis C, and each reach the back of a successive seed, one loader surface 86 per seed, in sequence as that seed reaches the belt 34.

The paddles 84 may or may not contact the metering member 24, and may engage the seed while the seed is still adhered to the metering member 24 (by virtue of the pressure differential), after the pressure differential is released, broken, disrupted, etc., or after the seed is otherwise released from the metering member 24. Also with reference to the illustrated constructions, the paddles 84 are spaced from the star wheel 50 so as not to receive a seed until after the arm 52 of the star wheel 50 has left the aperture 26, thereby inhibiting interference between the paddles 84 and the arms 52 of the star wheel 50. The paddles 84 contact each seed and push, guide, or otherwise function as a backstop for each seed as the seed transversely enters the bristles 58 of the belt 34. In one construction, the pressure differential does not release until the seed has entered the bristles 58 of the belt 34. In other constructions, the pressure differential may be terminated at the desired release position to release the seed.

Figure 19:
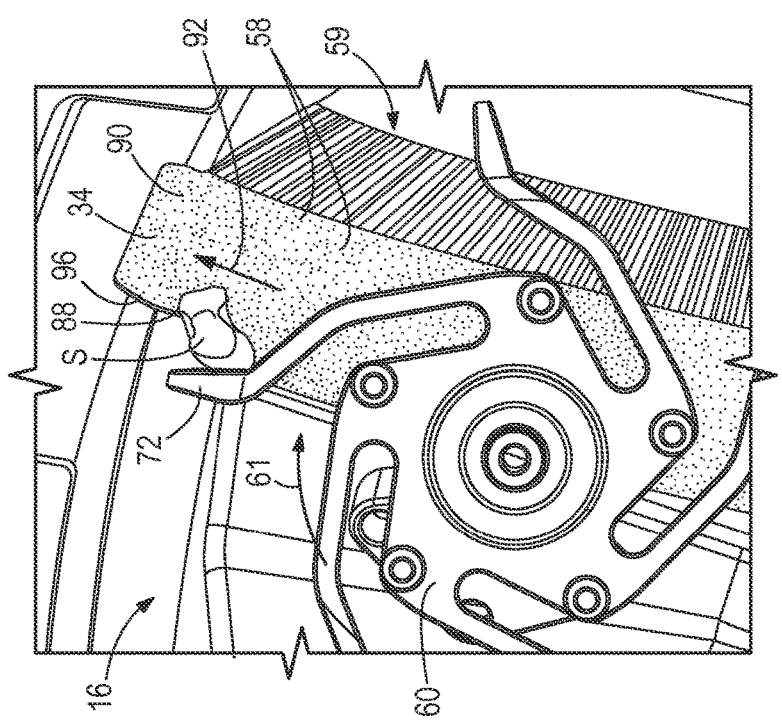
FIG. 19 is a rear view of the loader of FIG. 18 employed with the seed meter assembly of FIG. 2.
Figure 22:
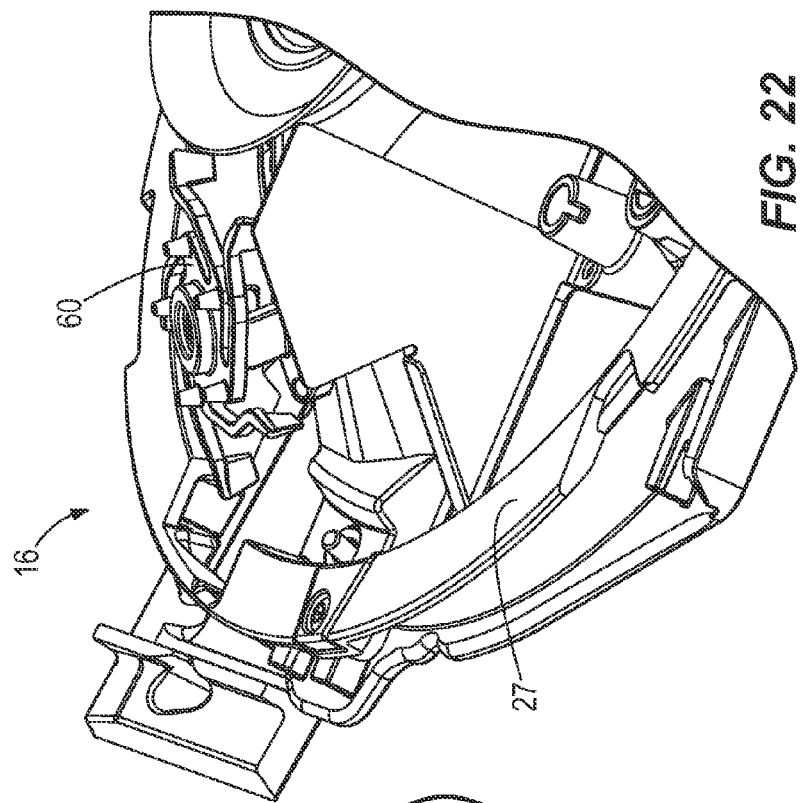
FIG. 22 is another rear perspective view of the seed meter assembly of FIG. 2 having the metering member removed.
Figure 21:
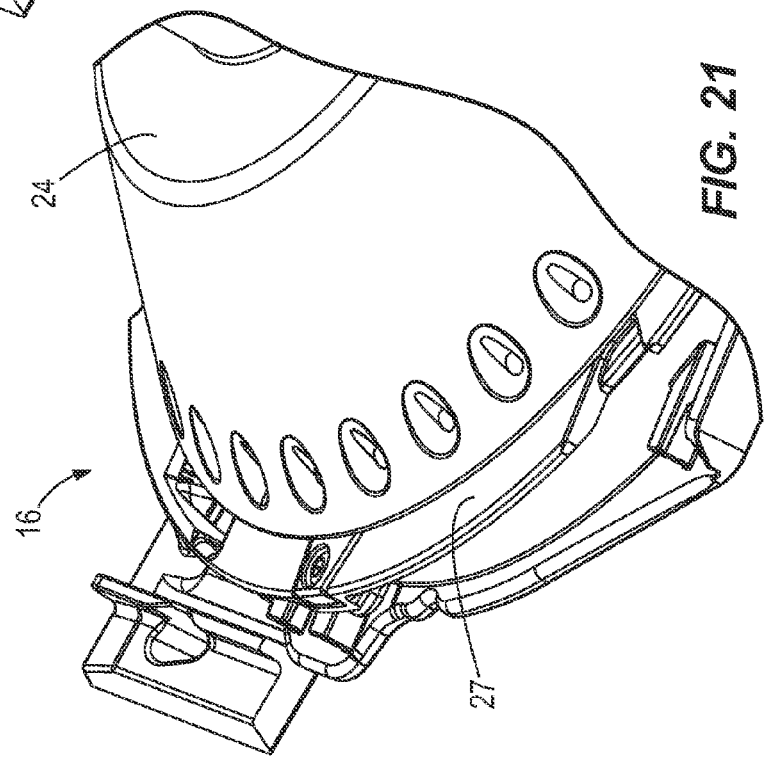
FIG. 21 is a rear perspective view of the seed meter assembly of FIG. 2 illustrating the metering member as transparent.

In the construction of FIGS. 18-22, the second portion 80 and the third portion 82 of each paddle arm 72 are disposed at an angle of less than 180 degrees with respect to one another, thereby creating a cradle 98 facing generally in the direction of rotation for facilitating grip and control of seed transfer as illustrated in FIG. 19. Thus, the second portion 80 may also guide or contact the seed S in order to control seed placement and transfer.

The illustrated loader 60 is disposed to overlap with the belt 34 of the seed delivery mechanism 32 such that the paddles 84 enter the bristles 58 of the belt 34 as the paddles 84 transfer a seed into the bristles 58 of the belt 34. As shown in FIG. 19, the loader 60 may be positioned to enter into a corner 96 of the belt 34 formed by the junction of sides 88 and distal ends 90 of the bristles 58 of the belt 34 and pass substantially laterally into and transversely through the bristles 58 of the belt 34 with respect to a direction of movement 92 of the belt 34 (e.g., generally perpendicular to movement of the belt 34 or transverse at any other angle with respect to movement of the belt 34). The belt 34 is driven to be moving away from the paddle 84 passing the seed such that the seed is urged away from the loader 60 (rather than under the loader) as the seed is transferred to the belt 34 (see FIGS. 3 and 19). The loader 60 may be slightly tilted with respect to the belt 34 such that the paddles 84 push the seeds into the bristles 58 both transversely and somewhat downwardly toward a base 59 of the bristles 58. In other constructions, the paddles 84 may travel generally parallel with the direction of travel 92 of the belt 34 (e.g., counter to the direction of travel 92 of the belt 34).

In the event an extra seed lodges between one of the paddle arms 72 and an inner wall 94 of the seed meter housing 27, the paddle arms 72 may flex to allow the loader 60 and the metering member 24 to continue rotation and to discourage failure of parts. As illustrated in FIG. 19 and FIG. 23, the paddle arms 72 extend from the hub portion 62 at least partially in a radial direction and at least partially in a circumferential direction with respect to the loader axis C. The loader 60 is driven to rotate clockwise in the view of FIG. 19 and FIG. 23, and the paddle arms 72 extend generally in the counterclockwise direction (i.e., the opposite direction from the direction of rotation), thereby allowing flexion of the paddle arm 72 toward the hub portion. In other constructions, the paddle arms 72 may extend in the same direction as the direction of rotation, thereby allowing flexion of the paddle arm 72 away from the hub portion. Additionally or alternatively, the inner wall 94 may be formed from a flexible material and/or mounted for flexion to allow the loader 60 and the metering member 24 to overcome the lodged seed, continue rotation, and discourage failure of parts.

Thus, the loader 60 includes at least one loader surface 86 movable between a first position (e.g., the backstop position) in which the loader surface 86 is disposed adjacent one of the apertures 26 in a direction opposite the direction of travel 31 of the metering member and a second position in which the loader surface 86 is not disposed adjacent one of the apertures 26 in a direction opposite the direction of travel 31 of the metering member. In the first position, the loader surface 86 is furthermore disposed at the central radial distance F1 adjacent one of the apertures 26. And, for example, in the second position, the loader surface 86 may be spaced from the central radial distance F1, e.g., the loader surface 86 may be spaced radially inwards, radially outwards, away from the apertures 26 in a direction generally normal to the metering member 24, etc. The loader surface 86 may be movable in any suitable manner into and out of the first position for guiding the seed from the metering member 24 to the seed delivery mechanism 32.

Thus, the disclosure provides, among other things, a loader 60 for facilitating transfer of seeds from the seed meter assembly 16 individually, reliably and securely into the belt 34 of the seed delivery mechanism 32. Various features and advantages of the invention are set forth in the following claims.

What is claimed is:

1. A seed meter assembly for a seeding machine, the seed meter assembly comprising:
    a metering member mounted for rotation about a meter axis and driven to rotate in a direction of travel, the metering member having an inner surface configured to receive seeds and an outer surface, and apertures passing through the metering member between the inner surface and the outer surface at a radial distance from the meter axis; and
    a loader including at least one loader surface movable into and out of a position in which the loader surface is disposed at the radial distance, adjacent one of the apertures.

2. The seed meter assembly of claim 1, wherein the metering member includes driving members, wherein the loader includes driven members, and wherein the driving members are configured to engage the driven members as the metering member rotates about the meter axis such that the metering member drives the loader about a loader axis.

3. The seed meter of claim 2, wherein the loader includes a hub portion concentric with the loader axis, wherein the driven members extend from the hub portion at a first radial distance from the loader axis, and wherein the at least one loader surface is disposed at a second radial distance from the loader axis greater than the first radial distance.

4. The seed meter of claim 3, wherein the driven members include drive pegs extending from the hub portion in a direction generally parallel with the loader axis.

5. The seed meter assembly of claim 1, wherein the loader includes a plurality of loader surfaces arranged circumferentially about the loader axis.

6. The seed meter assembly of claim 1, wherein the loader includes a rotatably mounted hub portion and an arm extending from the hub portion, wherein the arm is cantilevered from the hub portion, and wherein the at least one loader surface extends from the arm.

7. The seed meter assembly of claim 6, wherein the arm extends at least partially in a radial direction from the hub portion and at least partially in a circumferential direction from the hub portion.

8. The seed meter assembly of claim 1, wherein the at least one loader surface generally faces into the direction of travel of the metering member in the position.

9. A row unit for a seeding machine, the row unit comprising:
    a seed meter assembly having a rotatable metering member for selecting and transporting seeds from a seed pool, the metering member being driven about a meter axis for rotation in a direction of travel, wherein the metering member includes apertures disposed at a radial distance from the meter axis;
    a seed delivery mechanism for discharging the seeds from the seeding machine; and
    a loader disposed between the metering member and the seed delivery mechanism for directing the seeds from the metering member to the seed delivery mechanism, the loader including a loader surface configured to move into and out of a position in which the loader surface is disposed at the radial distance, adjacent one of the apertures.

10. The row unit of claim 9, wherein the loader is driven for movement by the rotatable metering member.

11. The row unit of claim 10, wherein the loader includes drive pegs driven by engagement with driving members extending from the metering member.

12. The row unit of claim 9, wherein the loader is rotatably mounted and driven for rotation by the rotatable metering member.

13. The row unit of claim 9, wherein the loader includes a rotatably mounted hub portion and an arm extending from the hub portion, wherein the arm is cantilevered from the hub portion and includes a paddle having the loader surface configured to guide a seed carried by the metering member.

14. The row unit of claim 13, wherein the arm extends at least partially in a radial direction from the hub portion and at least partially in a circumferential direction from the hub portion.

15. The seed meter assembly of claim 9, wherein the loader surface generally faces into the direction of travel of the metering member in the position.

16. The seed meter of claim 1, wherein the radial distance is defined from the meter axis to a point within a diameter of the adjacent one of the apertures.

17. The seed meter of claim 1, wherein the radial distance is defined from the meter axis to a center of one of the apertures.

18. The seed meter of claim 1, wherein, in the position, the loader surface is adjacent one of the apertures in a direction opposite the direction of travel.

19. The seed meter of claim 18, wherein the position is a backstop position in which the loader surface is configured to backstop one of the seeds.

20. The row unit of claim 9, wherein, in the position, the loader surface is adjacent one of the apertures in a direction opposite the direction of travel such that the position is a backstop position in which the loader surface is configured to backstop one of the seeds as the one of the seeds is directed from the metering member to the seed delivery mechanism.

\* \* \* \* \*